US010956738B1

(12) United States Patent
Gottemukkula et al.

(10) Patent No.: US 10,956,738 B1
(45) Date of Patent: *Mar. 23, 2021

(54) IDENTITY AUTHENTICATION USING AN INLIER NEURAL NETWORK

(71) Applicant: EyeVerify, Inc., Kansas City, MO (US)

(72) Inventors: Vikas Gottemukkula, Kansas City, KS (US); Sashi Kanth Saripalle, Overland Park, KS (US)

(73) Assignee: EyeVerify, Inc., Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/797,903

(22) Filed: Feb. 21, 2020

Related U.S. Application Data

(63) Continuation of application No. 16/665,944, filed on Oct. 28, 2019, now Pat. No. 10,607,077.

(51) Int. Cl.
| | |
|---|---|
| *G06K 9/00* | (2006.01) |
| *G06F 21/32* | (2013.01) |
| *G06N 3/04* | (2006.01) |
| *G06N 3/08* | (2006.01) |

(52) U.S. Cl.
CPC ......... *G06K 9/00617* (2013.01); *G06F 21/32* (2013.01); *G06K 9/0061* (2013.01); *G06N 3/0454* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 9,721,150 | B2 * | 8/2017 | Gottemukkula | G06K 9/00268 |
| 10,013,773 | B1 * | 7/2018 | Ogale | G06K 9/00791 |
| 10,607,077 | B1 * | 3/2020 | Gottemukkula | G06F 21/32 |
| 2007/0110283 | A1 * | 5/2007 | Hillhouse | G06K 9/6255 |
| | | | | 382/115 |
| 2011/0138187 | A1 * | 6/2011 | Kaga | G06F 21/32 |
| | | | | 713/186 |
| 2011/0182483 | A1 * | 7/2011 | Du | G06K 9/0061 |
| | | | | 382/117 |

(Continued)

FOREIGN PATENT DOCUMENTS

| | | | | |
|---|---|---|---|---|
| WO | WO-2018102717 A1 * | 6/2018 | | G06K 9/4628 |

OTHER PUBLICATIONS

Ocular biometrics—Automatic feature extraction from eye images. Choras. (Year: 2011).*

(Continued)

*Primary Examiner* — Delomia L Gilliard
(74) *Attorney, Agent, or Firm* — Fish & Richardson P.C.

(57) ABSTRACT

Methods, systems, and apparatus, including computer programs encoded on a computer storage medium, for biometric identity authentication. In one aspect, a method comprises: determining: (i) a plurality of first interest points in a first image of an eye of a first user, and (ii) a plurality of second interest points in a second image of an eye of a second user; determining a plurality of interest point pairs; processing a network input comprising the interest point pairs using an inlier neural network to generate a network output comprising a plurality of inlier scores; and determining whether an identity of the first user matches an identity of the second user based on the inlier scores.

20 Claims, 4 Drawing Sheets

AUTHENTICATION SYSTEM 100

(56) References Cited

U.S. PATENT DOCUMENTS

| | | | |
|---|---|---|---|
| 2014/0016830 A1* | 1/2014 | Wang | G06K 9/6892 |
| | | | 382/115 |
| 2015/0326570 A1* | 11/2015 | Publicover | G02B 27/017 |
| | | | 726/4 |
| 2016/0035078 A1* | 2/2016 | Lin | G06K 9/66 |
| | | | 382/157 |
| 2016/0086030 A1* | 3/2016 | Gottemukkula | G06K 9/00926 |
| | | | 382/117 |
| 2017/0124385 A1* | 5/2017 | Ganong | G06Q 30/0241 |
| 2017/0135577 A1* | 5/2017 | Komogortsev | A61B 3/14 |
| 2018/0018451 A1* | 1/2018 | Spizhevoy | G06K 9/00617 |
| 2018/0211401 A1* | 7/2018 | Lee | G06K 9/6202 |
| 2019/0130248 A1* | 5/2019 | Zhong | G06F 16/2462 |
| 2019/0163962 A1* | 5/2019 | Chan | H04L 67/22 |
| 2020/0026908 A1* | 1/2020 | Henderson | G06K 9/6248 |
| 2020/0143137 A1* | 5/2020 | Gottemukkula | G06K 9/00885 |

OTHER PUBLICATIONS

Vaswani et al., "Attention Is All You Need," 31st Conference on Neural Information Processing Systems, Jun. 2017, 11 pages.

* cited by examiner

IDENTITY AUTHENTICATION USING AN INLIER NEURAL NETWORK

CROSS-REFERENCE TO RELATED APPLICATIONS

This application is a continuation of U.S. patent application Ser. No. 16/665,944, filed on Oct. 28, 2019, which is hereby incorporated by reference in its entirety.

BACKGROUND

This specification relates to identity authentication systems.

An identity authentication system can be used to determine the identity of a user, for example, a user of a kiosk (e.g., an ATM kiosk) or a personal device (e.g., a smartphone). In some cases, an identity authentication system can determine the identity of a user based at least in part on biometric features derived from the unique appearance of the eye of the user.

SUMMARY

This specification describes a system implemented as computer programs on one or more computers in one or more locations that determines the identity of a user based on an image depicting an eye of the user.

According to a first aspect there is provided a method for biometric identity authentication. The method includes determining: (i) a set of first interest points in a first image of an eye of a first user, and (ii) a set of second interest points in a second image of an eye of a second user. A set of interest point pairs are determined, where each interest point pair specifies coordinates of a first interest point in the first image and coordinates of a second interest point in the second image. A network input including the interest point pairs is processed using an inlier neural network to generate a network output including a set of inlier scores. Each inlier score corresponds to a respective interest point pair and characterizes a likelihood that the first interest point and the second interest point of the interest point pair correspond to a same position in an eye of a same user. The method includes determining whether an identity of the first user matches an identity of the second user based on the inlier scores.

In some implementations, processing the network input including the interest point pairs using the inlier neural network to generate the network output including the set of inlier scores includes processing the interest point pairs using one or more embedding neural network layers to generate a respective embedded representation of each interest point pair. The embedded representations of the interest point pairs are processed using an attention neural network layer to generate a context embedded representation of each interest point pair. The context embedded representations of the interest point pairs are processed using one or more subsequent neural network layers to generate the inlier scores.

In some implementations, processing the embedded representations of the interest point pairs using the attention neural network layer to generate the context embedded representation of each interest point pair includes determining, for each interest point pair, a value representation of the interest point pair as a function of the embedded representation of the interest point pair. For each interest point pair, the context embedded representation of the interest point pair is generated based on a linear combination of the value representations of the interest point pairs.

In some implementations, the method further includes processing the first image and the second image using an encoder neural network, where the encoder neural network is configured to process an image to generate a feature map characterizing the image. Determining the set of first interest points in the first image may include determining the set of first interest points using the feature map characterizing the first image. Determining the set of second interest points in the second image may include determining the set of second interest points using the feature map characterizing the second image.

In some implementations, the method further includes determining a respective feature representation of each first interest point using the feature map characterizing the first image. A respective feature representation of each second interest point is determined using the feature map characterizing the second image. Determining the set of interest point pairs includes, for each interest point pair, determining a similarity measure between: (i) the feature representation of the first interest point of the interest point pair, and (i) the feature representation of the second interest point of the interest point pair.

In some implementations, the encoder neural network and the inlier neural network are jointly optimized using machine learning training techniques.

In some implementations, the encoder neural network is a convolutional neural network.

In some implementations, determining whether the identity of the first user matches the identity of the second user based on the inlier scores includes determining that the identity of the first user matches the identity of the second user based on at least a threshold number of the inlier scores satisfying a predefined threshold.

According to a second aspect there is provided a system including one or more computers and one or more storage devices communicatively coupled to the one or more computers. The one or more storage devices store instructions that, when executed by the one or more computers, cause the one or more computers to perform the operations of the method of the first aspect.

According to a third aspect there are provided one or more non-transitory computer storage media storing instructions that when executed by one or more computers cause the one or more computers to perform the operations of the method of the first aspect.

Particular embodiments of the subject matter described in this specification can be implemented so as to realize one or more of the following advantages.

This specification describes an authentication system that can authenticate the identity of a user by determining that the identity of the user matches the identity of a reference user. To authenticate the identity of the user, the authentication system may match interest points in a "test" image of an eye of the user (e.g., that is obtained when the user requests authentication) to interest points in a "reference" image of an eye of the reference user. In particular, the authentication system can match an interest point in the test image to an interest point in the reference image by comparing respective features characterizing the two interest points. However, matching interest points in the test image and the reference image may yield false positives, i.e., where an interest point in the test image is matched to an interest point in the reference image despite the two interest points not corresponding to the same position in the eye of the same user. Incorrectly matching interest points in the test image to interest points in the reference image may increase the likelihood of an authentication failure, e.g., where the user is incorrectly identified as the reference user.

Therefore, to authenticate the identity of the user more accurately, the authentication system described in this specification uses an "inlier" neural network to process data specifying the coordinates of the matched interest point pairs to generate an "inlier score" for each matched interest point pair. The inlier score for a matched interest point pair characterizes a likelihood that the specified pair of interest points correspond to the same position in the eye of the same user. The inlier neural network may identify certain matched interest point pairs as false positives by implicitly determining that their spatial positions are inconsistent with the spatial positions of the remaining matched interest point pairs.

The authentication system described in this specification can generate the features characterizing the interest points in the test and reference images using an "encoder" neural network that is configured to process an image to generate a feature map representing the image. The authentication system can jointly optimize the encoder neural network and the inlier neural network using machine learning training techniques, thereby increasing the increasing the accuracy of the authentication system (i.e., relative to a system that did not jointly optimize the encoder neural network and the inlier neural network).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
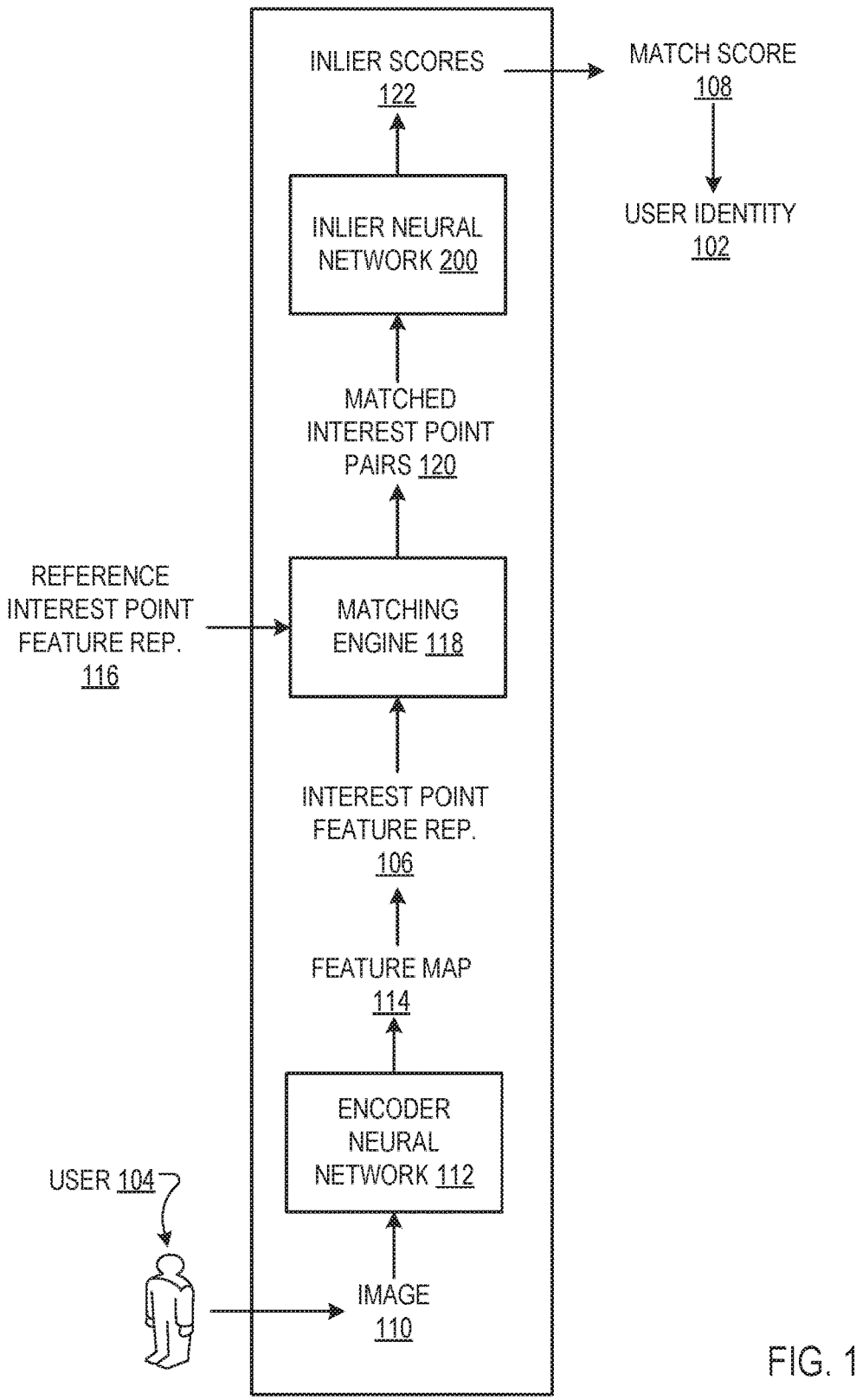
FIG. 1 is a block diagram of an example authentication system.

This specification describes an authentication system that can determine the identity of a user based at least in part on a set of feature representations which characterize the appearance of interest points in an eye of the user. The eye of a user can have unique properties which distinguish it from the eyes of other users. Therefore, properties of the eye of the user can be used in determining the identity of the user. The properties of an eye can include, for example, the vasculature structure in the sclera (i.e., the white) of the eye, the color and texture of the iris of the eye, and the texture in periocular region. As will be described in more detail below, the authentication system can determine whether the identity of the user matches the identity of a "reference user" by comparing respective sets of feature representations which characterize the appearance of interest points in an eye of the user and an eye of the reference user.

The authentication system described in this specification can be used in any of a variety of settings. A few examples follow.

In some implementations, the authentication system is used in a kiosk. For example, the kiosk may be an automated teller machine (ATM) that allows users to deposit money, withdraw money, or view their financial information. As another example, the kiosk may be deployed at the entrance to a location (e.g., an arena or stadium), and may grant or deny users access to the location. As another example, the kiosk may be deployed at a restaurant (e.g., a fast-food outlet), and may allow users to order and pay for food. In this example, the kiosk may include a display device (e.g., a capacitive touch screen) that allows a user to select and order food. Once the user completes the selection (e.g., by user-interfaces presented on the display device), the user may be prompted to look towards a kiosk camera. The authentication system may use the kiosk camera to capture an image of one or both of the eyes of the user. The authentication system may process the image to generate a set of feature representations characterizing one or both of the eyes of the user, and thereafter use the feature representations to determine the identity of the user. After the authentication system determines the identity of the user, the kiosk may deduct payment for the food from a bank account associated with the identity of the user.

In some implementations, the authentication system is used in a personal device of a user, for example, a smartphone, smartwatch, or desktop computer. The device may use the authentication system to determine the identity of the user before allowing the user to perform "restricted" actions. Examples of restricted actions may include unlocking the device, accessing certain data using the device (e.g., financial data or medical data), or performing certain actions using the device (e.g., downloading applications or changing passwords). When the device determines a user is attempting to perform a restricted action, the authentication system may use a device camera to capture an image of one or both of the eyes of the user. The authentication system may process the image to generate a set of feature representations characterizing one or both of the eyes of the user, and thereafter use the feature representations to determine the identity of the user. After the authentication system determines the identity of the user, the device can determine whether the user is authorized to perform the restricted actions.

The authentication system described in this specification may determine the identity of a user based on other factors in addition to the appearance of an eye of the user, e.g., based on the facial appearance of the user, a fingerprint of the user, an alphanumerical password provided by the user, or a combination thereof.

FIG. 1 is a block diagram of an example authentication system 100. The authentication system 100 is an example of a system implemented as computer programs on one or more computers in one or more locations in which the systems, components, and techniques described below are implemented.

The authentication system 100 is configured to determine the identity 102 of a user 104 (e.g., of a kiosk or a personal device) based at least in part on a set of feature representations 106 characterizing one or both of the eyes of the user 104. For convenience, the description which follows will refer to the feature representations 106 as characterizing one of the eyes of the user 104. To determine the identity 102 of the user 104, the authentication system 100 determines a match score 108 between the user 104 and a reference user, and uses the match score 108 to determine whether the identity of the user 104 matches the identity of the reference user. As described earlier, the authentication system 100 may be used in a kiosk (e.g., an ATM kiosk), a personal device (e.g., a smartphone), or as a component of any other appropriate system.

The authentication system 100 uses a camera to capture an image 110 which depicts the eye of the user 104. In addition to depicting the eye of the user 104, the image 110 may depict some or all of the periocular space that is outside the eye of the user (e.g., including the skin around the eye). The camera may be, for example, an integrated component of a kiosk (e.g., an ATM kiosk) or a personal device (e.g., a smartphone) using the authentication system 100 to determine the identity 102 of the user 104.

The image 110 can be represented in any appropriate format. For example, the image 110 may be represented by a set of multiple "channels", that is, two-dimensional arrays of numerical values (e.g., integer or floating point values). The channels may include one or more of: a red color channel, a green color channel, a blue color channel, an ultraviolet channel, or an infrared channel. The channels of the image 110 are "registered", that is, numerical values in corresponding positions in different channels represent light reflecting from the same portion of the environment.

The authentication system 100 provides the image 110 to a convolutional encoder neural network 112 that includes multiple convolutional neural network layers. The encoder neural network 112 is configured to process the image 110 in accordance with values of a set of encoder neural network parameters to generate a feature map 114. The feature map 114 may be represented as an ordered collection of numerical values that is indexed by two spatial coordinates and a channel coordinate.

The authentication system 100 processes the feature map 114 to identify a set of interest points in the feature map 114. The interest points may represent the positions of distinguishing features in or around the eye of the user (e.g., branching points in the vasculature in the sclera, points with distinct textural features in the iris, or texture and permanent marks on the skin around the eye). To identify the set of interest points, the authentication system 100 may determine a "strength" value for each spatial position in the feature map 114. The authentication system 100 may determine the strength value for a spatial position, e.g., as a norm (e.g., an $L_2$ norm) of the components of the feature map 114 at the spatial position, or as the determinant of a Hessian matrix computed based on the components of the feature map in and around the spatial location. The authentication system 100 may then identify the interest points in the feature map 114 as a set of spatial positions in the feature map 114 having the highest strength values. As part of identifying the interest points, the authentication system 100 may apply non-maximum suppression techniques to avoid identifying multiple closely clustered interest points that correspond to the same distinguishing feature in the eye. In some implementations, the authentication system 100 may identify a predetermined number of spatial positions with the highest strength values as interest points.

In some cases, the authentication system 100 may identify the interest points in an intermediate feature map generated by the encoder neural network 112, and then project the interest points onto the output feature map 114. An intermediate feature map 114 refers to a feature map generated by an "intermediate" layer of the encoder neural network 112, in contrast to the feature map 114, which is generated by the output layer of the encoder neural network 112. An intermediate layer refers to a neural network layer which generates an output that is either provided directly to the output layer, or processed by one or more intervening neural network layers before being provided to the output layer. In some cases, the intermediate feature map may have a higher spatial resolution than the output feature map 114, and therefore using the intermediate feature map may enable the authentication system 100 to identify interest points more accurately.

The authentication system 100 generates a respective feature representation 106 for each interest point in the feature map 114. The feature representation of an interest point may be represented as an ordered collection of numerical values, e.g., a vector or matrix of numerical values. In one example, the authentication system 100 may determine the feature representation of an interest point to be defined by the values of the components of the feature map at the spatial location specified by the interest point. In another example, the authentication system 100 may determine the feature representation of an interest point to be defined by the values of the components of the feature map in a region (e.g., a 3-D rectangular region) of a predetermined size that is centered on the interest point. In another example, the authentication system 100 may determine the feature representation of an interest point by concatenating: (i) features characterizing the feature map 114 at the interest point (as described earlier), and (ii) features characterizing the image 110 at the interest point. The features characterizing the image at the interest point may be, e.g., histogram of oriented gradients (HOG) features, scale-invariant feature transform (SIFT) features, or speeded up robust features (SURF). In this example, the authentication system 100 may separately normalize the features characterizing the feature map 114 at the interest point and the features characterizing the image 110 at the interest point.

The authentication system 100 uses the feature representations 106 characterizing the interest points in the image 110 of the eye of the user 104 ("user interest points") in determining the identity 102 of the user 104. In particular, the authentication system 100 determines whether the identity 102 of the user 104 matches the identity of a reference user. A reference user refers to a user that has been "enrolled" by the authentication system 100. The authentication system 100 enrolls a given user by generating a set of "reference" feature representations characterizing interest points in an image of an eye of the given user ("reference interest points"). The authentication system 100 can maintain respective sets of interest point feature representations characterizing the eyes of reference users in a data store (e.g., a logical data storage area or physical data storage device).

For each of one or more reference users, the authentication system 100 compares the user interest point feature representations 106 characterizing the eye of the user 104 to the reference interest point feature representations 116 characterizing the eye of the reference user as part of generating a corresponding match score 108. The match score 108 between the user 104 and a given reference user characterizes a likelihood that the identity of the user 104 matches the identity of the given reference user. For example, a higher match score may indicate a higher likelihood that the identity of the user 104 matches the identity of the given reference user.

The authentication system 100 determines the match score 108 between the user 104 and a reference user using a matching engine 118 and an inlier neural network 200, which will each be described in more detail next.

The matching engine 118 is configured to match feature representations 106 of user interest points to corresponding feature representations 116 of reference interest points. The matching engine 118 may match a user interest point feature representation 106 to a reference interest point feature representation 116 if a similarity measure between the feature representations satisfies a threshold value. The similarity measure may be, e.g., a Euclidean similarity measure or a cosine similarity measure. The matching engine 118 can use any appropriate matching algorithm to match the user interest point feature representations 106 to the reference interest point feature representations 116, e.g., a greedy nearest-neighbor matching algorithm or a ratio based matching algorithm. For each user interest point feature representation 106 that is matched to a reference interest point feature representation 116, the matching engine 118 outputs a corresponding matched interest point pair 120. The matched interest point pair specifies: (i) the coordinates of the user interest point in the image 110, and (ii) the coordinates of the reference interest point in the image which was used to derive the feature representations 116 of the reference interest points. The coordinates may be expressed in any appropriate coordinate system, e.g., a Euclidean coordinate system or a polar coordinate system.

Generally, even if the identity of the user matches the identity of the reference user, certain matched interest point pairs 120 identified by the matching engine 118 may be "false positives". A matched interest point pair specifying a user interest point and a reference interest point is referred to as a false positive if the user interest point and the reference interest point do not correspond to the same position in the eye of the same user. For example, if identity of the user does not match the identity of the reference user, then each matched interest point pair 120 would be a false positive. As another example, if the identity of the user does match the identity of the reference user, then a matched interest point pair 120 may be a false positive if the user interest point and the reference interest point correspond to different positions in the eye of the user.

Even for a "true positive" matched interest point pair 120 (i.e., where the user interest point and the reference interest point correspond to the same position in the eye of the user), the user interest point coordinates may differ from the reference interest point coordinates. For example, the user interest point coordinates may be expressed in a coordinate system that is translated and rotated compared to the coordinate system used to express the reference interest point coordinates. Generally, for the true positive matched interest point pairs, the coordinates of the user interest points are "globally consistent" with the coordinates of the reference interest points. That is, an "alignment" transformation can be determined such that, for each true positive matched interest point pair, applying the alignment transformation to the user interest point coordinates approximately aligns them with the corresponding reference interest point coordinates. The alignment transformation may be, e.g., an affine transformation that is specified by rotation, translation, scaling, and shearing operations. In contrast, for a false positive matched interest point pair, applying the alignment transformation to the user interest point coordinates generally does not align them with the corresponding reference interest point coordinates. Therefore, knowing the alignment transformation would enable the true positive matched interest point pairs to be distinguished from the false positive matched interest point pairs. However, accurately estimating the alignment transformation (e.g., using a numerical optimization procedure) may be difficult.

The authentication system 100 uses the inlier neural network 200 to identify the true positive matched interest point pairs 120. More specifically, the inlier neural network 200 is configured to generate a respective "inlier score" 122 for each matched interest point pair. The inlier score 122 for a matched interest point pair characterizes a likelihood that the user interest point and the reference interest point specified by the matched interest point pair correspond to the same position in the eye of the same user. That is, the inlier score 122 for a matched interest point pair characterizes the likelihood that the matched interest point pair is a true positive. To generate the inlier scores 122, the inlier neural network 200 processes a network input that includes the collection of matched interest point pairs 120, i.e.:

$$\{[P_i^{user}, P_i^{ref}]\}_{i=1}^N \tag{1}$$

where i indexes the matched interest point pairs 120, $P_i^{user}$ are the coordinates of the user interest point specified by the i-th matched interest point pair, and $P_i^{ref}$ are the coordinates of the reference interest point specified by the i-th matched interest point pair.

Generally, the inlier neural network 200 generates the inlier scores 122 for the matched interest point pairs 120 by implicitly characterizing the global consistency (as described earlier) of the user interest point coordinates the reference interest point coordinates. An example architecture of the inlier neural network is described with reference to FIG. 2 and example techniques for training the inlier neural network are described with reference to FIG. 3.

The authentication system 100 determines the match score 108 between the user 104 and the reference user based on the inlier scores 122. In one example, the authentication system 100 may determine the match score M as:

$$M = \log(1 + N^*) \tag{2}$$

where N* is the number of matched interest point pairs 120 having an inlier score 122 that satisfies a predefined threshold. The authentication system 100 determines whether the identity of the user 104 matches the identity of the reference user based on the match score 108 between the user 104 and the reference user. For example, the authentication system 100 may determine that the identity of the user 104 matches the identity of the reference user if the match score 108 satisfies a predefined threshold.

Figure 2:
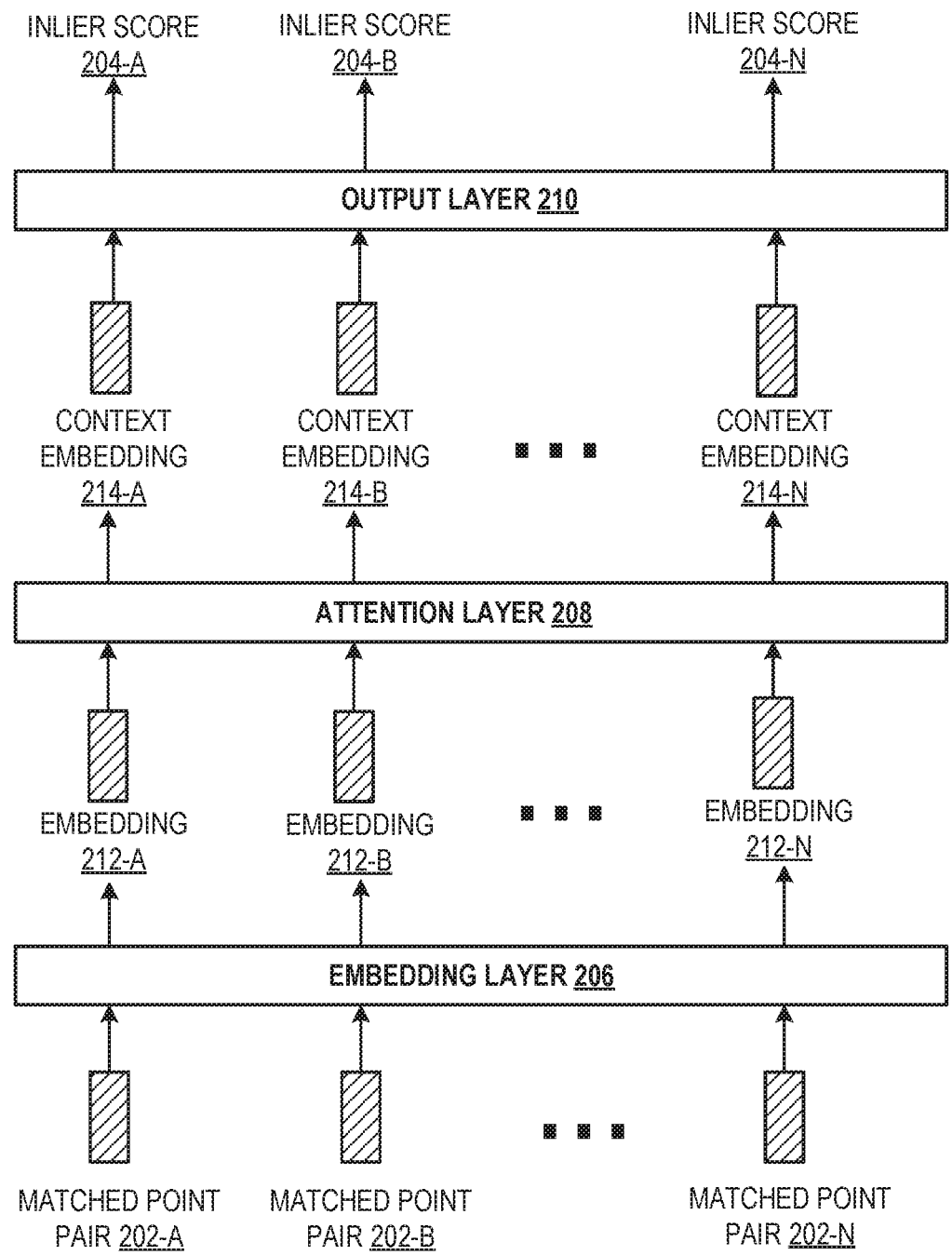
FIG. 2 illustrates an example architecture of an inlier neural network.

FIG. 2 illustrates an example architecture of an inlier neural network 200. The inlier neural network is configured to process the collection of matched (interest) point pairs 202-A-N to generate a corresponding inlier score 204-A-N for each matched point pair. The inlier score for a matched point pair characterizes the likelihood that the user interest point coordinates and the reference interest point coordinates specified by the matched point pair correspond to the same position in the eye of the user.

The collection of matched point pairs 202-A-N provided as input to the inlier neural network 200 are generally not associated with any ordering. Therefore, the inlier neural network 200 (and in particular, each of its layers) are implemented in a manner that is "permutation invariant", i.e., that does not rely on any ordering of the matched point pairs 202-A-N. The inlier neural network 200 may include an embedding layer 206, an attention layer 208, and an output layer 210, each of which will be described in more detail next. Variations of the inlier neural network architecture described with reference to FIG. 2 are possible, e.g., the inlier neural network may have multiple attention layers, multiple embedding layers, or both.

The embedding layer 206 is configured to process each matched point pair 202-A-N to generate a corresponding embedding 212-A-N. The embedding for a matched point pair is an ordered collection of numerical values (e.g., a vector of numerical values) representing the matched point pair. In one example, the embedding layer 206 generates the embedding $E_i$ for each matched point pair $[P_i^{user}, P_i^{ref}]$ as:

$$E_i = f([P_i^{user}, P_i^{ref}] \cdot A + b) \quad (3)$$

where A is a learned weight matrix, b is a learned bias vector, and f is a non-linear activation function, e.g., a sigmoid function.

The attention layer 208 is configured to process the embeddings 212-A-N to generate a context embedding 214-A-N for each matched point pair 202-A-N. In one example, the attention layer 208 may generate the context embedding $CE_i$ for the i-th matched point pair as:

$$CE_i = \sum_{j=1}^{N} \alpha_{ij} \cdot E_j \quad (4)$$

where j indexes the embeddings $\{E_j\}_{j=1}^N$ and $\{\alpha_{ij}\}_{j=1}^N$ are scaling factors. The attention layer determines the scaling factors $\{\alpha_{ij}\}_{j=1}^N$ as a function of the embeddings $\{E_j\}_{j=1}^N$, e.g., as:

$$\alpha_{ij} = E_i^T \cdot W \cdot E_j \quad (5)$$

where W is a learned weight matrix. In another example, the (self-) attention layer 208 may generate the context embedding $CE_L$ for the i-th matched point pair as:

$$CE_i = E_i + f((W_{query} \cdot E_i) \cdot K^T) \cdot V \quad (6)$$

$$K = (W_{key} \cdot E_i)_{j=1}^N \quad (7)$$

$$V = (W_{value} \cdot E_j)_{j=1}^N \quad (8)$$

where $W_{query}$, $W_{key}$, and $W_{value}$ are learned weight matrices, f is a soft-max function, and α is a constant normalization factor. Generally, the attention layer 208 enables the inlier neural network 200 to share information between the embeddings 212-A-N of the matched point pairs 202-A-N.

The output layer 210 is configured to process the context embeddings 214-A-N to generate an inlier score 204-A-N for each matched point pair 202-A-N. In one example, the output layer may generate the inlier score $IS_i$ for the i-th matched point pair as:

$$IS_i = f(X \cdot CE_i) \quad (9)$$

where X is a learned weight matrix, $CE_i$ is the context embedding for the i-th matched point pair, and f(·) is a non-linear activation function, e.g., a sigmoid function or a tan h function.

Figure 3:
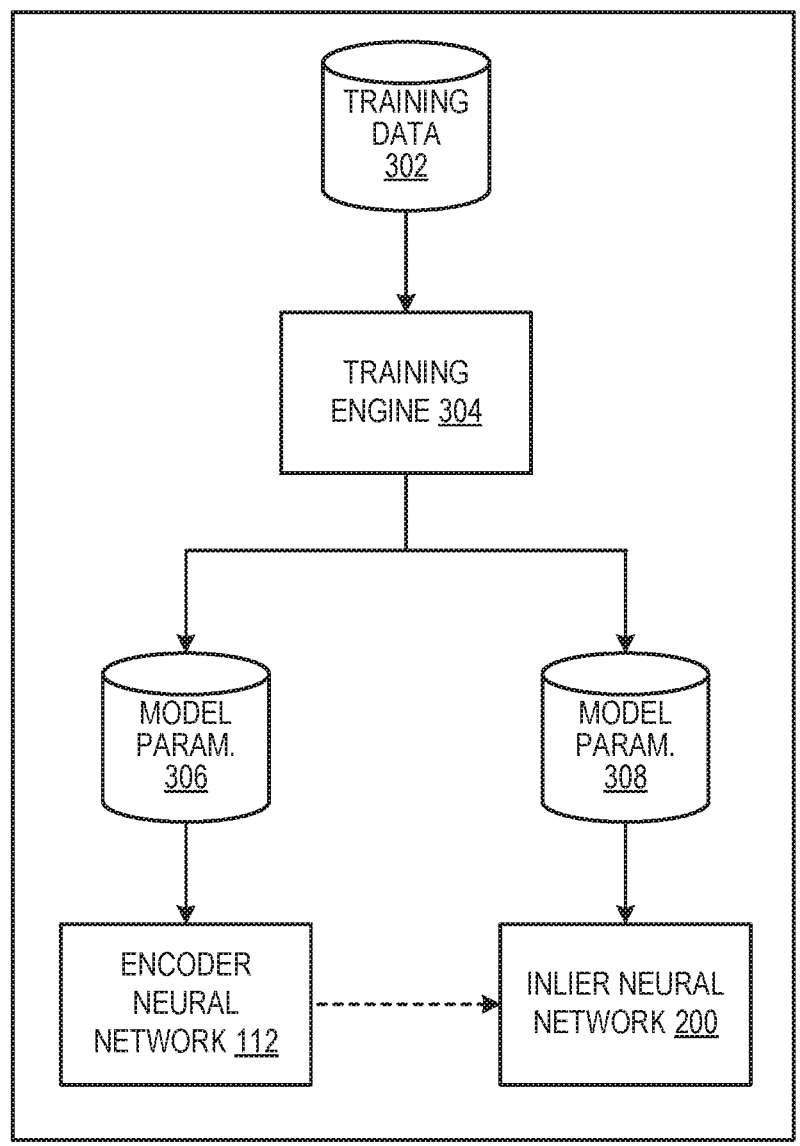
FIG. 3 is a block diagram of an example training system.

FIG. 3 is a block diagram of an example training system 300. The training system 300 is an example of a system implemented as computer programs on one or more computers in one or more locations in which the systems, components, and techniques described below are implemented.

The training system 300 is configured to train the encoder neural network 112 and the inlier neural network 200 on a set of training data 302 using a training engine 304. The training data 302 may include: (i) a collection of images that depict the eyes of users, and (ii) a label indicating the identity of the user depicted in each image.

During an initial training phase, the training system 300 may train the encoder neural network 112 and the inlier neural network 200 separately. The initial training phase may be followed by a joint training phase, where the training system 300 jointly trains the encoder neural network and the inlier neural network 200. During the initial training phase, the encoder neural network may be trained to generate feature maps for images that result in the identification of interest points approximately matching those that would be identified using conventional techniques (e.g., blob, ridge, and edge detection techniques). Similarly, during the initial training phase, the inlier neural network may be trained to generate inlier scores that match those that would be generated using conventional techniques (e.g., techniques described with reference to U.S. Pat. No. 9,721,150 B2). The initial training phase for the encoder and inlier neural networks may effectively initialize their respective parameter values to improve the efficiency of the joint training phase, where the encoder and inlier neural networks are jointly trained to optimize the overall accuracy of the authentication system.

During the initial training phase, the training system 300 may train the encoder neural network 112 by iteratively adjusting the values of the model parameters 306 of the encoder neural network. At each training iteration, the training system 300 may select a "batch" (set) of one or more images from the training data 302, and process the images using the encoder neural network 112 to generate corresponding feature maps. The training system 300 may further process each feature map to generate a corresponding "strength map", where the strength map indicates a strength value for each spatial position of the feature map. The training system 300 may determine the strength value for a spatial position in a feature map, e.g., as a norm (e.g., an $L_2$ norm) of the components of the feature map at the spatial position, as described earlier. For each image, the training system 300 may also determine a "target" strength map that specifies a "target" strength value for each spatial position in the corresponding feature map. The training system 300 may determine the target strength map for an image, e.g., by applying one or more conventional interest point detection algorithms to the image, e.g., a blob detection algorithm, a ridge detection algorithm, or an edge detection algorithm.

The training engine 304 may adjust the current values of the model parameters of the encoder neural network using gradients of an objective function that measures a similarity between: (i) the strength map generated using the encoder neural network, and (ii) the target strength map, for each image. In one example, the objective function may be given by:

$$\mathcal{L}_{enc} = \sum_{j=1}^{J} |S_j - T_j|_p^p \quad (10)$$

where J is the total number of images in the current batch, $S_j$ is the strength map for image j that is generated using the encoder neural network, $T_j$ is the target strength map for image j, and, e.g., $p \in \{1,2\}$. In some implementations, the objective function may include a further term that measures a difference between: (i) a measure of central tendency (e.g., the average) of the strength map generated using the encoder neural network, and (ii) a measure of the quality of the image. The image quality may be determined based on textural features of the image, e.g., as the energy of Gray-Level Co-Occurrence matrices (GLCM) computed from the image, or based on filtered images generated by applying Gabor filters parameterized by different angles to the image.

During the initial training phase, the training system 300 may train the inlier neural network 200 by iteratively adjusting the values of the model parameters 308 of the inlier neural network. In the description which follows, the initial training phase for the inlier neural network is assumed to follow the initial training phase for the encoder neural network 112. At each training iteration, the training system 300 may select a batch of one or more pairs of images from the training data, where each image pair includes two images that both depict the eye of the same user.

For each image pair, the training system 300 may determine a set of matched point pairs using the encoder neural network 112 and the matching engine, as described with reference to FIG. 1. The training system 300 processes the set of matched point pairs for the image pair using the inlier neural network to determine corresponding inlier scores, as described with reference to FIG. 2). The training system 300 estimates the parameters of an alignment transformation (e.g., parameterized as a 3×3 affine matrix) that, for each matched point pair having an inlier score above a predefined threshold value, approximately aligns the user interest point coordinates and the reference interest point coordinates specified by the matched point pair. The training system 300 further determines target inlier scores and a target alignment transformation for the set of matched point pairs, e.g., using a random sample consensus (RANSAC) algorithm as described with reference to U.S. Pat. No. 9,721,150 B2.

The training engine 304 may adjust the current values of the model parameters of the inlier neural network using gradients of an objective function that measures a similarity between: (i) the inlier scores and the alignment transformation determined using the inlier neural network, and (ii) the target inlier scores and the target alignment transformation, for each image pair. In one example, the objective function may be given by:

$$\mathcal{L}_{inlier} = \sum_{j=1}^{J} MSE(IS_j, IS_j^{target}) + MSE(TM_j, TM_j^{target}) \quad (11)$$

where J is the total number of images in the current batch, MSE(.,.) refers to the mean squared error measure, $IS_j$ refers to the inlier scores determined using the inlier neural network for image j, $IS^{target}$ refers to the target inlier scores for image j, $TM_j$ refers to the alignment transformation determined using the inlier neural network for image j, and $TM_j^{target}$ refers to the target alignment transformation for image j. In some implementations, MSE can be replaced by smooth $L_1$ loss. In some implementation, the number of matched point pairs are increased by lowering the strength threshold and descriptor match threshold by randomly sub-sampling to avoid overfitting.

During the joint training phase, the training system 300 jointly trains the encoder neural network and the inlier neural network 200 by iteratively adjusting the values of their respective model parameters. At each training iteration, the training system 300 may select a batch of one or more pairs of images from the training data. An image pair that includes two images that depict the eye of the same user is referred to as a "genuine" image pair, and an image pair that includes two images that depict the eyes of different users is referred to as an "impostor" image pair. For each image pair, the training system 300 processes the images using the encoder neural network 112 and the matching engine to determine a set of matched point pairs, and processes the matched point pairs using the inlier neural network 200 to generate corresponding inlier scores. For each image pair, the training system 300 may determine the number of inlier scores that satisfy a predefined threshold value, and then determine the match score between the two images of the image pair, e.g., as described with reference to equation (2).

The training engine 304 may adjust the current values of the model parameters of the encoder neural network and the inlier neural network using gradients of an objective function, e.g., that is given by:

$$\mathcal{L} = \log(1 + N) - \left( \frac{1}{|\mathcal{G}|} \sum_{G \in \mathcal{G}} M_G - \frac{1}{|\mathcal{I}|} \sum_{I \in \mathcal{I}} M_I \right) \quad (12)$$

where G refers to a genuine image pair, $\mathcal{G}$ refers to the set of genuine image pairs in the current batch, $|\mathcal{G}|$ refers to the number of genuine image pairs in the current batch, $M_G$ refers to the match score for genuine image pair G, I refers to an impostor image pair, $\mathcal{I}$ refers to the set of impostor image pairs, $|\mathcal{I}|$ refers to the number of imposter image pairs in the current batch, $M_I$ refers to the match score for impostor image pair I, and N refers to the number of matched point pairs. During the joint training phase, the training system 300 may additionally continue to train the encoder neural network and the inlier neural network individually, e.g., using the objective functions described with reference to equations (10) and (11). Generally, the training engine 304 jointly trains the encoder and inlier neural networks using an objective function (e.g., as described with reference to equation (12)) that encourages the generation of match scores that discriminate between genuine image pairs and imposter image pairs.

Figure 4:
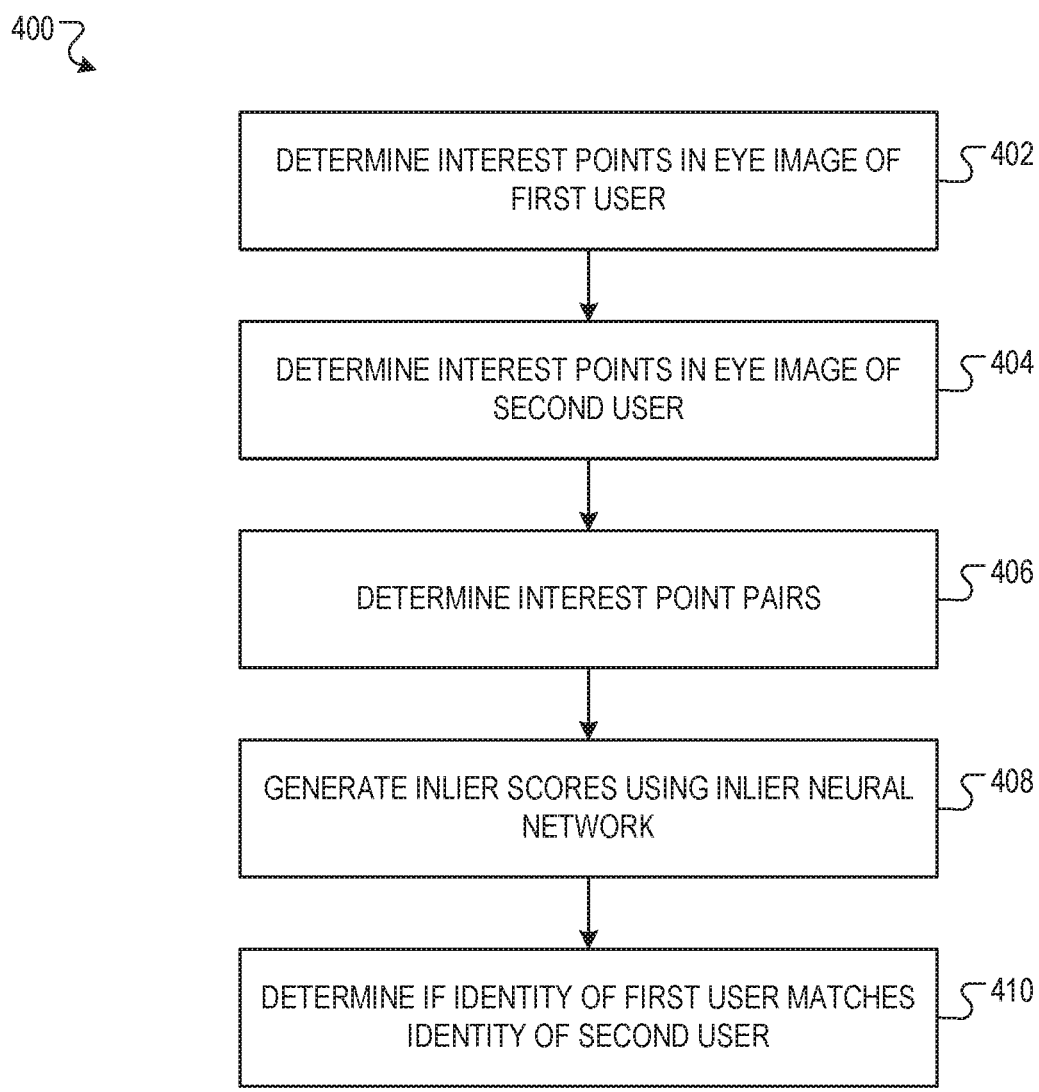
FIG. 4 is a flow diagram of an example process for authenticating the identity of a user.

FIG. 4 is a flow diagram of an example process 400 for authenticating the identity of a user. For convenience, the process 400 will be described as being performed by a system of one or more computers located in one or more locations. For example, an authentication system, e.g., the authentication system 100 of FIG. 1, appropriately programmed in accordance with this specification, can perform the process 400.

The system determines a set of interest points in an image of an eye of a first user (402). To determine the interest points, the system may process the image of the eye of the first user using a convolutional encoder neural network to generate a feature map characterizing the image, and determine the interest points from the feature map.

The system determines a set of interest points in an image of an eye of a second user (404). To determine the interest points, the system may process the image of the eye of the second user using the encoder neural network to generate a feature map characterizing the image, and determine the interest points from the feature map.

The system determines a set of interest point pairs, where each interest point pair specifies: (i) coordinates of an interest point in the first image, and (ii) coordinates of an interest point in the second image (406). To determine the interest point pairs, the system may determine a respective feature representation for each interest point in the image of the eye of the first user and for each interest point in the image of the eye of the second user. The system may determine the feature representation of each interest point in an image from the feature map generated by the encoder neural network for the image. As part of identifying each interest point pair, the system may compute a similarity measure (e.g., a Euclidean or cosine similarity measure) between the feature representations of the interest points included in the interest point pair. In one example, the system may determine that an interest point in the image of the eye of the first user and an interest point in the image of the eye of the second user should be identified as an interest point pair if the similarity measure between their respective feature representations satisfies a threshold value.

The system processes a network input including the interest point pairs using an inlier neural network to generate a network output including a set of inlier scores (408). Each inlier score corresponds to a respective interest point pair and characterizes a likelihood that the interest points of the interest point pair corresponding to the same position in the eye of the same user. To generate the inlier scores, the inlier neural network may process the interest point pairs using one or more embedding neural network layers to generate a respective embedded representation of each interest point pair. The inlier neural network may process the embedded representations of the interest point pairs using an attention neural network layer to generate a context embedded representation of each interest point pair. The context embedded representation of each interest point pair may be a linear combination of the embedded representations of the interest point pairs. The inlier neural network may process the context embedded representations of the interest point pairs using one or more subsequent neural network layers to generate the inlier scores.

The system determines whether the identity of the first user matches the identity of the second user based at least in part on the inlier scores (410). For example, the system may determine that the identity of the first user matches the identity of the second user based on whether at least a threshold number of the inlier scores satisfy a predefined threshold value.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
   obtaining: (i) a plurality of first interest points in a first image of an eye of a first user, and (ii) a plurality of second interest points in a second image of an eye of a second user;
   determining a plurality of interest point pairs, wherein each interest point pair corresponds to: (i) a respective first interest point in the first image, and (ii) a respective second interest point in the second image; and
   providing a network input comprising the plurality of interest point pairs as an input to an inlier neural network,
      wherein the inlier neural network is configured to process the network input comprising the plurality of interest point pairs to generate a network output comprising a plurality of inlier scores,
      wherein each inlier score corresponds to a respective interest point pair and characterizes a likelihood that the first interest point and the second interest point of the interest point pair correspond to a same position in an eye of a same user.

2. The method of claim 1, further comprising:
determining whether an identity of the first user matches an identity of the second user based on the inlier scores.

3. The method of claim 1, wherein processing the network input comprising the plurality of interest point pairs using the inlier neural network to generate the network output comprising the plurality of inlier scores comprises:
processing the interest point pairs using one or more embedding neural network layers to generate a respective embedded representation of each interest point pair;
processing the embedded representations of the interest point pairs using an attention neural network layer to generate a context embedded representation of each interest point pair; and
processing the context embedded representations of the interest point pairs using one or more subsequent neural network layers to generate the inlier scores.

4. The method of claim 3, wherein processing the embedded representations of the interest point pairs using the attention neural network layer to generate the context embedded representation of each interest point pair comprises:
determining, for each interest point pair, a value representation of the interest point pair as a function of the embedded representation of the interest point pair; and
generating, for each interest point pair, the context embedded representation of the interest point pair based on a linear combination of the value representations of the interest point pairs.

5. The method of claim 1, further comprising:
processing the first image and the second image using an encoder neural network, wherein the encoder neural network is configured to process an image to generate a feature map characterizing the image;
wherein determining the plurality of first interest points in the first image comprises:
determining the plurality of first interest points using the feature map characterizing the first image;
wherein determining the plurality of second interest points in the second image comprises:
determining the plurality of second interest points using the feature map characterizing the second image.

6. The method of claim 5, further comprising:
determining a respective feature representation of each first interest point using the feature map characterizing the first image;
determining a respective feature representation of each second interest point using the feature map characterizing the second image;
wherein determining the plurality of interest point pairs comprises, for each interest point pair, determining a similarity measure between: (i) the feature representation of the first interest point of the interest point pair, and (i) the feature representation of the second interest point of the interest point pair.

7. The method of claim 6, wherein the encoder neural network and the inlier neural network are jointly optimized using machine learning training techniques.

8. The method of claim 5, wherein the encoder neural network is a convolutional neural network.

9. The method of claim 2, wherein determining whether the identity of the first user matches the identity of the second user based on the inlier scores comprises:
determining that the identity of the first user matches the identity of the second user based on at least a threshold number of the inlier scores satisfying a predefined threshold.

10. A system comprising:
one or more computers; and
one or more storage devices communicatively coupled to the one or more computers, wherein the one or more storage devices store instructions that, when executed by the one or more computers, cause the one or more computers to perform operations comprising:
obtaining: (i) a plurality of first interest points in a first image of an eye of a first user, and (ii) a plurality of second interest points in a second image of an eye of a second user;
determining a plurality of interest point pairs, wherein each interest point pair corresponds to: (i) a respective first interest point in the first image, and (ii) a respective second interest point in the second image; and
providing a network input comprising the plurality of interest point pairs as an input to an inlier neural network,
wherein the inlier neural network is configured to process the network input comprising the plurality of interest point pairs to generate a network output comprising a plurality of inlier scores,
wherein each inlier score corresponds to a respective interest point pair and characterizes a likelihood that the first interest point and the second interest point of the interest point pair correspond to a same position in an eye of a same user.

11. The system of claim 10, wherein the operations further comprise:
determining whether an identity of the first user matches an identity of the second user based on the inlier scores.

12. The system of claim 10, wherein processing the network input comprising the plurality of interest point pairs using the inlier neural network to generate the network output comprising the plurality of inlier scores comprises:
processing the interest point pairs using one or more embedding neural network layers to generate a respective embedded representation of each interest point pair;
processing the embedded representations of the interest point pairs using an attention neural network layer to generate a context embedded representation of each interest point pair; and
processing the context embedded representations of the interest point pairs using one or more subsequent neural network layers to generate the inlier scores.

13. The system of claim 12, wherein processing the embedded representations of the interest point pairs using the attention neural network layer to generate the context embedded representation of each interest point pair comprises:
determining, for each interest point pair, a value representation of the interest point pair as a function of the embedded representation of the interest point pair; and
generating, for each interest point pair, the context embedded representation of the interest point pair based on a linear combination of the value representations of the interest point pairs.

14. The system of claim 10, wherein the operations further comprise:
processing the first image and the second image using an encoder neural network, wherein the encoder neural network is configured to process an image to generate a feature map characterizing the image;

wherein determining the plurality of first interest points in the first image comprises:

determining the plurality of first interest points using the feature map characterizing the first image;

wherein determining the plurality of second interest points in the second image comprises:

determining the plurality of second interest points using the feature map characterizing the second image.

15. The system of claim 14, wherein the operations further comprise:

determining a respective feature representation of each first interest point using the feature map characterizing the first image;

determining a respective feature representation of each second interest point using the feature map characterizing the second image;

wherein determining the plurality of interest point pairs comprises, for each interest point pair, determining a similarity measure between: (i) the feature representation of the first interest point of the interest point pair, and (i) the feature representation of the second interest point of the interest point pair.

16. The system of claim 15, wherein the encoder neural network and the inlier neural network are jointly optimized using machine learning training techniques.

17. The system of claim 14, wherein the encoder neural network is a convolutional neural network.

18. The system of claim 10, wherein determining whether the identity of the first user matches the identity of the second user based on the inlier scores comprises:

determining that the identity of the first user matches the identity of the second user based on at least a threshold number of the inlier scores satisfying a predefined threshold.

19. One or more non-transitory computer storage media storing instructions that when executed by one or more computers cause the one or more computers to perform operations comprising:

obtaining: (i) a plurality of first interest points in a first image of an eye of a first user, and (ii) a plurality of second interest points in a second image of an eye of a second user;

determining a plurality of interest point pairs, wherein each interest point pair corresponds to: (i) a respective first interest point in the first image, and (ii) a respective second interest point in the second image; and providing a network input comprising the plurality of interest point pairs as an input to an inlier neural network, wherein the inlier neural network is configured to process the network input comprising the plurality of interest point pairs to generate a network output comprising a plurality of inlier scores, wherein each inlier score corresponds to a respective interest point pair and characterizes a likelihood that the first interest point and the second interest point of the interest point pair correspond to a same position in an eye of a same user.

20. The non-transitory computer storage media of claim 19, wherein the operations further comprise:

determining whether an identity of the first user matches an identity of the second user based on the inlier scores.

* * * * *

UNITED STATES PATENT AND TRADEMARK OFFICE
CERTIFICATE OF CORRECTION

PATENT NO. : 10,956,738 B1
APPLICATION NO. : 16/797903
DATED : March 23, 2021
INVENTOR(S) : Vikas Gottemukkula and Sashi Kanth Saripalle Page 1 of 1

It is certified that error appears in the above-identified patent and that said Letters Patent is hereby corrected as shown below:

In the Claims

In Claim 6, Column 17, Line 58, delete "(i)" and insert -- (ii) --, therefor.

In Claim 15, Column 19, Line 24, delete "(i)" and insert -- (ii) --, therefor.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*